G. LAUBE.
PLATE LIFTER.
APPLICATION FILED DEC. 10, 1908.

951,783.

Patented Mar. 8, 1910.

2 SHEETS—SHEET 1.

Witnesses
P. L. Farrington.
M. E. Lowry.

Inventor
Godfrid Laube,
By H. C. Everts
Attorneys

G. LAUBE.
PLATE LIFTER.
APPLICATION FILED DEC. 10, 1908.
951,783.
Patented Mar. 8, 1910.
2 SHEETS—SHEET 2.
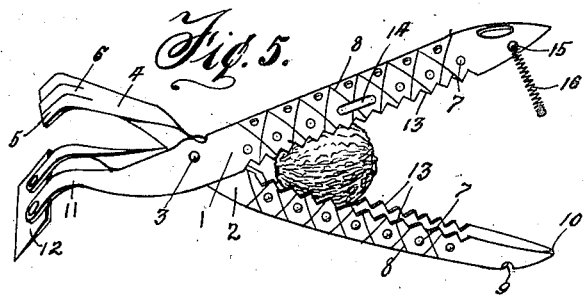
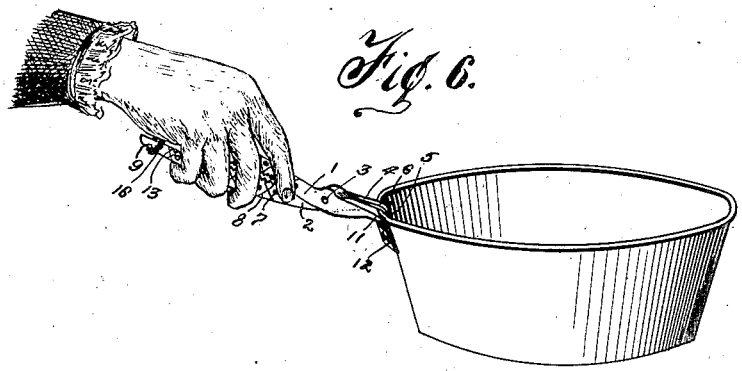
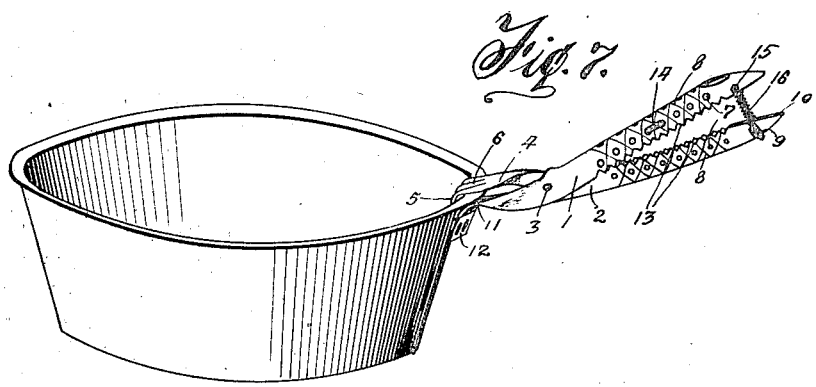
Witnesses
P. L. Farrington.
M. E. Lowry
Inventor
Godfried Laube
By H. C. Everts & Co.
Attorneys

UNITED STATES PATENT OFFICE.

GODFRIED LAUBE, OF SANTA MONICA, CALIFORNIA, ASSIGNOR TO HATTIE R. LAUBE AND GEORGE N. BARTLETT, OF SANTA MONICA, CALIFORNIA.

PLATE-LIFTER.

951,783.  Specification of Letters Patent.  Patented Mar. 8, 1910.

Application filed December 10, 1908. Serial No. 466,901.

*To all whom it may concern:*

Be it known that I, GODFRIED LAUBE, a citizen of the United States of America, residing at Santa Monica, in the county of Los Angeles and State of California, have invented certain new and useful Improvements in Plate-Lifters, of which the following is a specification, reference being had therein to the accompanying drawing.

This invention relates to a plate lifter, and the primary object of my invention is to combine a lifter, nut cracker, tack puller and utensil scraper, thus producing a household article that can be used for various purposes.

Another object of my invention is to provide a detachable handle and lifter for pans that can be easily secured to a pan without injuring the same.

A further object of my invention is to combine a scraper with the pan lifter, whereby any incrustation or foreign matter adhering to the pan or utensil can be readily removed.

A further object of my invention is to provide a pan lifter that can be used as a nut cracker, the handle portion of the lifter being used for this purpose and suitably braced to prevent distortion.

A still further object of my invention is to provide a pan lifter with a novel handle that will not become hot when the lifter is engaged with a pan set upon a stove or burner.

A still further object of this invention is to provide a simple, durable and inexpensive household article that will be positive in its action, and free from injury by ordinary use.

Figure 1:
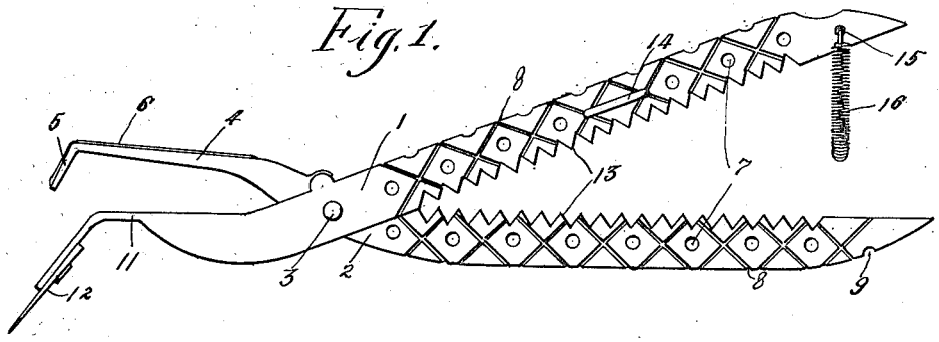
Figure 2:
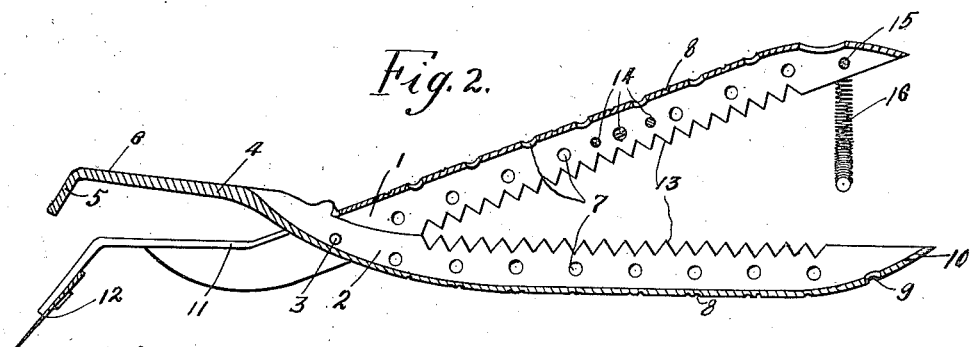
Figure 3:
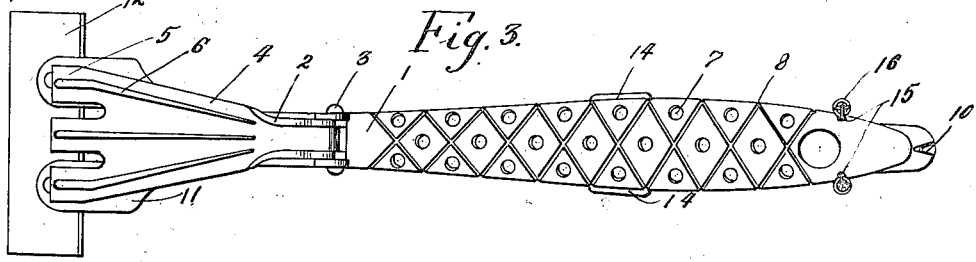
Figure 4:
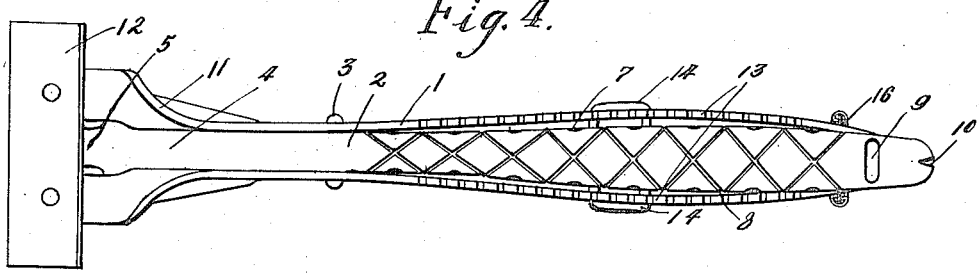

In the accompanying drawings: Figure 1 is a side elevation of a pan lifter constructed in accordance with my invention, Fig. 2 is a longitudinal sectional view of the same, Fig. 3 is a top plan, Fig. 4 is a bottom plan, Fig. 5 is a perspective view of the pan lifter used as a nut cracker, Fig. 6 is a similar view showing the pan lifter attached to a pan in a clamped position, and Fig. 7 is a similar view illustrating the pan lifter loosely mounted upon a pan.

In the accompanying drawings, 1 and 2 designate two channel-shaped members pivotally connected together by a transverse pin 3. The forward end of the member 2 is flared, as at 4, and provided with a plurality of depending gripping fingers 5, said fingers and the flared end of the member 2 being reinforced by longitudinally disposed ribs or corrugations 6. The rear end of the member 2 serves functionally as a handle and is provided with a plurality of openings or perforations 7 to permit air to circulate in and out the member and retain the member in a cool condition when fixed to a hot pan. The member is corrugated, as at 8, to permit of a positive grip being had on the same, and at the rear end thereof is provided with a transverse groove 9, for a purpose that will presently appear. The rear end of the member is notched, as at 10, whereby said member can be used as a tack puller.

The forward end of the member 1 is bifurcated, as at 11, to provide clearance for that portion of the member 2 pivoted in the member 1. The bifurcated end of the member 1 is bent downwardly at an inclination corresponding to the inclination of the depending fingers 5, and secured to the bifurcated end is a transverse scraper 12 employed for removing material that adheres to a pan. The scraper 12 is formed of thin spring metal, such as steel, so as to present a fine cutting or scraping edge to the material to be scraped, and to render the same flexible. The utility of flexibility in scrapers is generally recognized as it gives the same a greater scraping value, by enabling the scraping point to follow under the material instead of gliding over the same. By riveting the scraper to the legs 11 the same may be removed when worn. When the lifter is to be used on a cooking vessel or pot having an outwardly curved wall, the scraper 12 will be bent rearwardly on the curved wall so that there will be a tension created against the gripping fingers 5, whereby the lifter can secure a good hold on the upper edge of said vessel or pot.

The rear end of the member 1 is apertured and corrugated, similar to the member 2, and the confronting edges of these members are provided with serrations or teeth 13, whereby a nut can be gripped between said members and cracked.

To prevent the rear end of the member 1 from spreading when pressure is brought to bear upon the same, said member is provided with a transverse wire staple 14, the ends of said staple further facilitating the holding of the member 1 when the member 2 is allowed to drop preparatory to placing the lifter upon a pan.

Mounted transversely of the rear end of the member 1 is an eyebolt 15 and loosely connected to said eyebolt is a resilient loop 16 adapted to be placed over the rear end of the member 2 and engage in the groove 9 for holding said members in a closed position with the fingers 5 engaging the inner side of the pan, while the scraper at the end of the member 1 supporting said scraper engages the outer side of the pan. The member 12 therefore while capable of being used as a scraper, acts also as an important element of the implement when the latter is utilized as a lifter. Most pans or deep plates which are either set on the stove or placed in the oven where they become heated, are, as is well known, provided with a bead at the rim thereof, and when the lifter is used, the flaring part 4 will lie on the top edge of the utensil with the angle at the upper end of the lip 11 fitting under the bead, and when the two handle members are forced toward each other, the element 12 is brought into engagement with the outer face of the pan at a point considerably lower than where the fingers engage with the inner face of the pan, and the plate 12 being thin and flexible, yields under the pressure brought against the same so that a firm and effective grip is obtained on the pan such as will enable lifting thereof without danger of the lifter tending to act as though pivoted at the point where the pan is gripped. The element 12 therefore acts as a resilient yielding gripping bar or jaw, and being longer than the width of the lip, provides, as the same yields under pressure, an extended gripping engagement with the outer face of the pan as the handle members are forced together under pressure.

It is apparent from the foregoing description that I have devised a combined household article that will not injure granite or enamel ware to which it is secured, and will greatly facilitate the work of a chef in the culinary department.

While in the drawings forming a part of this application there is illustrated the preferred embodiments of my invention, it is obvious that the same can be varied or changed as to shape, proportion and manner of assemblage without departing from the spirit of the invention.

Having now described my invention what I claim as new, is:—

A pan lifter, comprising a pair of channel-shaped members pivotally-connected together, one handle member ending in an angled flared-extension, a plurality of fingers on said extension, the other handle member terminating at the corresponding end in a downwardly-extending bifurcated-lip, parallel to the aforesaid flared extension and of greater length than the fingers, and a gripping-jaw of thin flexible material riveted to the rear face of said lip and of a length to extend beyond the implement.

In testimony whereof I affix my signature in the presence of two witnesses.

GODFRIED LAUBE

Witnesses:
BLANCHARD OGDEN,
WM. H. D. SPEARS.